United States Patent [19]

Tatarka et al.

[11] Patent Number: 5,268,983
[45] Date of Patent: Dec. 7, 1993

[54] ROUND, DRY, ALL DIELECTRIC, FAN OUT COMPACT OPTICAL FIBER CABLE

[75] Inventors: Daniel Tatarka; Elbert O. Shiflett; George B. Anderson, all of Simpsonville, S.C.

[73] Assignee: Alcoa Fujikura Ltd., Brentwood, Tenn.

[21] Appl. No.: 986,682

[22] Filed: Dec. 8, 1992

[51] Int. Cl.$^5$ .................................................. G02B 6/44
[52] U.S. Cl. ...................................... 385/106; 385/103
[58] Field of Search ............... 385/102, 103, 106, 109, 385/112, 113

[56] References Cited

U.S. PATENT DOCUMENTS

| | | | |
|---|---|---|---|
| 4,645,298 | 2/1987 | Gartside, III | 385/106 |
| 4,702,554 | 10/1987 | Takahashi et al. | 385/106 X |
| 5,050,957 | 9/1991 | Hamilton et al. | 385/113 |
| 5,067,791 | 11/1991 | Nishiyama | 385/112 X |
| 5,155,789 | 10/1992 | Le Noane et al. | 385/106 |

Primary Examiner—John D. Lee
Attorney, Agent, or Firm—Elroy Strickland

[57] ABSTRACT

A round, compact, optical fiber cable comprises an outer protective jacket of insulating material having a plurality of individual bundles of optical fibers within the outer jacket. Each bundle includes an anti-buckling rod of electrically non-conductive material and encapsulated by a low modulus material. A plurality of optical fibers encapsulated also in a low modulus material is wound on and about the low modulus material encapsulating the rod in a manner that retards contraction and microbending of the optical fibers. Each of the bundles includes one or more protective jackets of electrically, non-conductive material enclosing the plurality of fibers, anti-buckling rod and encapsulating material. Also, means are provided for identifying individual bundles and fibers.

8 Claims, 1 Drawing Sheet

ROUND, DRY, ALL DIELECTRIC, FAN OUT COMPACT OPTICAL FIBER CABLE

BACKGROUND OF THE INVENTION

The present invention relates generally to optical fiber cables and more particularly to round "high count" fiber optic cables particularly useful for making multiple indoor connections between equipment and hardware that utilize (receive and send) large amounts of data transmitted through the fibers.

Present optical fiber technology typically uses individual or very low count cable (usually less than six fibers) to connect outdoor cables to central office switching equipment and hardware. Such individual or low count cables are inadequate since the amount of indoor connections, fiber counts, and central office racks required is in the hundreds and thousands, depending upon the demand at a given location. As a result, indoor locations have become and typically will become highly congested with cable unless action is taken to reduce the number of cables without reducing the number of optical fibers. In fact, the need is to reduce cable numbers while increasing fiber numbers.

Craftsmanship and the ease of cable handling when connecting fibers to equipment is proportional to (1) the compactness of the cable structure, (2) the accessibility to the fibers within each cable with commonly used craft tools such as strippers that do not nick the fibers, and (3) the adaptability of enclosures and equipment to the cable construction. In addition, supplemental identification techniques must be applied at the location of installation for most of the present cable designs. Hence, for the high count fiber cables, identification of each fiber becomes highly important in the fiber connection and termination process.

And, any new design is obviously more cost effective if existing cabling machinery can be used in making the new cable, as opposed to the use of specialized and dedicated equipment.

Hence, there are real needs for flexible optical fiber cables that can handle substantial amounts of information while remaining compact in size. As explained above, indoor office space is often unavailable for a substantial amount of cabling. When space is found, cables are snaked through and around equipment in a manner that requires a substantial amount of bending so that the fiber optics of the cable are subject to substantial bending and flexing. Any bending of the optics reduces the cables ability to conduct light and therefore can affect the ability to serve its purpose, which is the rapid transmission of substantial amounts of information and data in the form of light pulses.

Anti-buckling means in the fiber optic art, which can also serve as strain relief means for the more delicate optics, are known and have been the subject of patent disclosures, such as U.S. Pat. No. 4,269,024 to Ashpole et al and U.S. Pat. No. 5,101,467 to Bernard. Ashpole et al are concerned with strength (strain relief) members per se, while Bernard shows a cable primarily designed for outside pedestals located near ground level to receive underground cabling. Since the Bernard cable is for outdoor, underground use, the cable has a substantial amount of protective armoring.

In providing a cable for multiple connections to assorted equipment, each fiber within the cable must be accessible in a manner that leaves adjacent fibers intact, i.e., when one subunit or bundle of fibers is connected to one item of equipment, the remaining bundles need to remain in tact for use at adjacent and/or other locations and equipment. In other words, when the outer jacket of a cable is opened to obtain access to subunits of fibers, the remaining subunits need to remain intact so that they can be directed and connected to other related or unrelated equipment. All of this, of course, requires an outer jacketing system that permits easy access to the subunits within the jacket system, and subunits with jackets that maintain the subunits intact when the main, outer jacket is opened.

SUMMARY OF THE INVENTION

The above concerns are met by the cable of the present invention in which bundles or subunits of optical fiber cables are contained in an outer jacket of an insulating material, with each of the bundles themselves having a protective jacket. The protective jacket of each bundle contains a substantial plurality of optical fibers, which it maintains as a unit until the jacket is opened for access to the fibers. Each optical fiber is coated with a low modulus material that permits easy removal of each fiber from a center, dielectric rod and strength member which is also encapsulated with a layer of low modulus material.

Within the confines of the outer jacket and between the outer jacket and inner jacket of the individual bundles are strands of an insulating yarn material that provide additional strength and strain relief for the optics. Further, the material of yarn is preferably one that prevents the migration of water and moisture down the length of the cable and thereby maintains the interior of the cable dry. In this manner, no water resistant filler material is needed within the cable to prevent ingress of moisture and water. Such filler materials are generally greasy and make it difficult to work with the individual fibers in the process of connecting the fibers to terminals and equipment.

The optical fibers are wound on the rod in a manner that ties them to the rod so that the fibers resist contraction and microbending. This is effected by the low modulus material encapsulating the fibers and rod, as explained in detail below.

With individual "packaging" of the fiber bundles or subunits, when the outer jacket is opened to obtain access to the bundles, and only one bundle is needed for the purposes at hand, the other bundles remain in tact and thus ready for use when and where needed.

The outer and inner jackets can be opened with a ripcord embedded in the jackets, as shown in FIG. 1 of Applicants' drawings.

The subject cable is an all dielectric insulating cable such that no electrically conductive elements are present that would be available for the conducting of high voltage transients into the equipment and apparatus to which the fiber optics are connected.

BRIEF DESCRIPTION OF THE DRAWINGS

The advantages and objectives of the invention will be best understood from consideration of the following detailed description and the accompanying drawings in which.

DETAILED DESCRIPTION OF A PREFERRED EMBODIMENT

Figure 1:
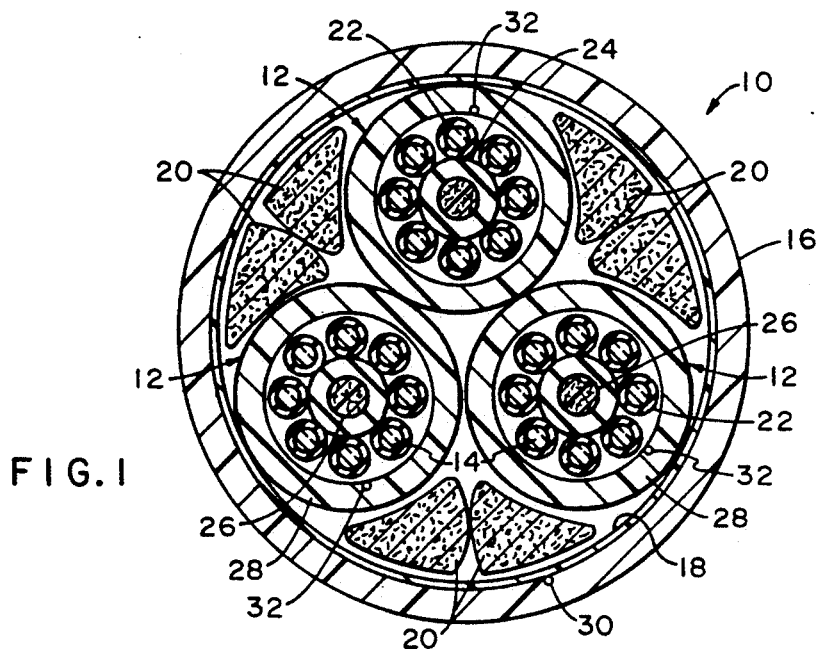
FIG. 1 is a cross-sectional view of a high count cable containing three bundles or subunits of eight fiber optics, the cable being constructed in accordance with the principles of the invention.

Referring now to the drawings, FIG. 1 thereof shows in cross section a round, all dielectric cable 10 comprised of three round bundles or subunits 12 of optical fibers 14, the number of fibers (eight) in each subunit, and the total number of fibers in the cable (twenty-four) being given by way of example only.

Cable 10 includes an outermost jacket 16 of insulating material, such as a PVC riser compound, and a wrapping of high strength insulating tape 18, such as polyethylene terephthalate, disposed about the combination of the three optical bundles 12. If the cable is used in an outdoor environment, then riser or plenum (flame retardant) compounds may not be necessary. Electrical non-conductive strands 20 are located between the wrapping 18 and bundles 12 to provide strain relief for the optics of the bundles and preferably to provide absorption of any water or moisture that might enter the interior of the cable. A preferred material for strands 20 is a water absorbing aramid yarn.

The bundles 12 and yarns 20 are tightly stranded together in a helical fashion to provide a compact construction. An appropriate diameter for cable of FIG. 1 is 6.9 mm, while the diameter of each bundle is 2.7 mm.

It will be noted in FIG. 1 that the strands or yarns 20 occupy a substantial portion of the area or space between bundles 12 and wrap 18. In this manner, the strands will tend to absorb substantially all water and moisture in the interior of the cable. This is advantageous in that the interior is otherwise free of water repellent fillers so that the optics 14 remain free of contamination by filler materials, thereby easing the process of the connecting fibers to their destined terminals and equipment, i.e., filler materials are generally greasy substances that must be wiped or otherwise removed from the fibers before they can be properly connected to terminals, hardware, etc.

As shown, each bundle 12 comprises a plurality of optical fibers 14 individually coated and enclosed with a layer of electrically non-conductive low modulus material 22 and helically applied to a layer of electrically non-conductive low modulus material 24 located on and encapsulating a rod 26 of electrically non-conductive material. A preferable material of the rod is fiber reinforced plastic, while the low modulus material of layers 22 and 24 is a relatively soft silicone rubber. An appropriate thickness for layers 22 and 24 is simply that amount of material sufficient to completely surround and encapsulate the rod and optical fibers. The rod is a relatively stiff structure that does not buckle when the cable is handled and bent, thereby protecting the fibers from microbends and outright breakage. Yet, the material of the rod is flexible to the degree that the bundle and the overall cable can be manipulated into corners and around equipment, as needed.

The low modulus material of the layers provided on the fibers and rods causes the fibers and rods to adhere together so that the fibers are "fixed" to the rods. Such adherence of the fibers to the rods prevents microbending of the fibers that can occur with contraction of the cable d unit caused by temperature changes because the center rods and fibers have similar coefficients of thermal expansion.

Also, because of the relative softness of the material of layers 22 and 24, individual fibers are easily removed from center rod 26 and the material easily removed from the individual fibers for connecting the fibers to terminals and hardware. The coating is removed with commonly used craft tools that do not nick the fibers.

The fibers, rod, and low modulus layers of each subunit 12 are bundled together by a protective jacket 28. The material of this jacket can also be a PVC riser compound, though other flame retardant materials can be used.

Access to bundles 22 can be provided by a ripcord 30 of strong insulating material such as nylon lying underneath the outer jacket 16. In the Figures, the ripcords are somewhat enlarged for purposes of illustration. In real life, the ripcords are quite small in cross section with the outer jacket material formed over them. Since the fibers within the outer jacket are contained within separate jackets 28, the opening of the outer jacket 16 and the unwrapping of tape 18 leaves the bundles intact so that they can be individually and diversely directed to the separate locations of equipment and hardware. When the end of each bundle is appropriately disposed for connection, end portions of inner jackets 28 can be removed from the fibers to allow connection of the fibers to the equipment. To this end, each inner jacket can also be provided with a ripcord 32 lying underneath the inner jacket.

All of the materials of cable 10, as thus described, are electrically non-conductive.

Figure 3:
FIG. 3 shows schematically means for placing indicia on a bundle for identification purposes.

Each bundle 12 and each fiber 14 are identified by appropriate numbers or letters printed or otherwise located on the surfaces of the fibers or by different colors (or combinations of letters, numbers, and/or colors). The material of the fibers themselves can be individually colored, as well as the low modulus layers 22 and 24 and jackets 28. Such identifying indicia can be provided in and/or on the layers 22, 24, and 28 using known on-line printing devices. FIG. 3 of the drawings shows diagrammatically such means 35 for applying indicia on a bundle 12. Appropriate means include ink injection devices and printing cylinders. Printing cylinders imprint or emboss nomenclature on the-jacket of the bundle.

Figure 2:
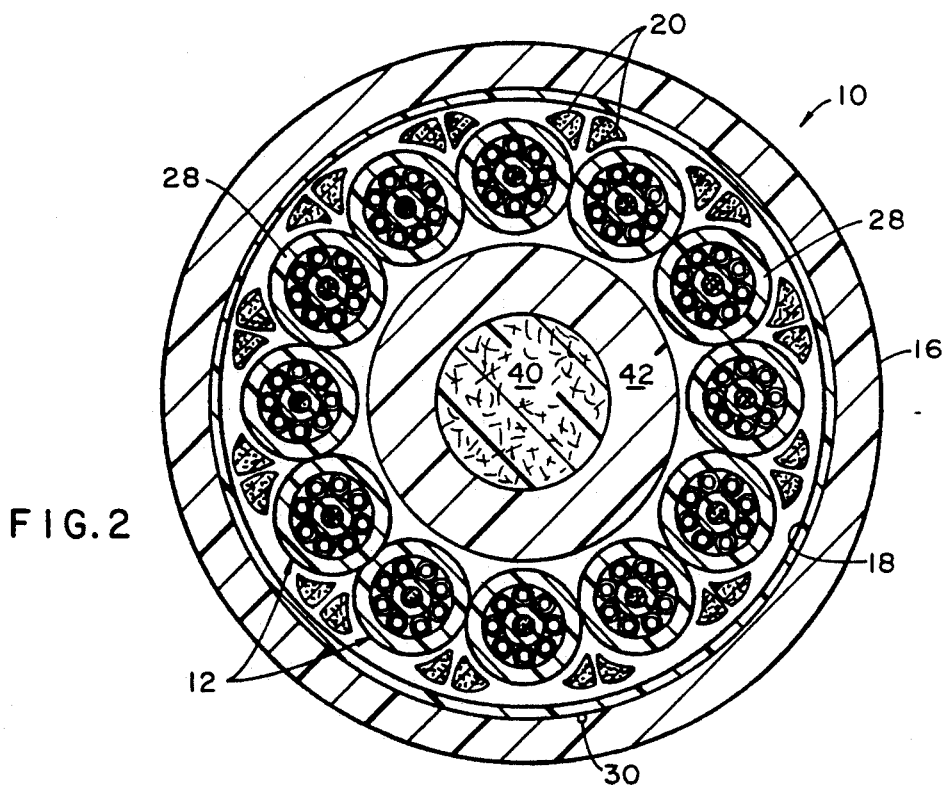
FIG. 2 is a cross-sectional view of a high count cable having twelve bundles or subunits of eight optical fibers, again constructed in accordance with the principles of the invention.

FIG. 2 of the drawings shows a round cable construction having a 144 fiber count, using twelve bundles or subunits of the type shown in FIG. 1, i.e., with each subunit containing twelve optical fibers. In FIG. 2, those components that correspond to the components of FIG. 1 bear the same reference numerals.

In FIG. 2, an electrically non-conductive member 40 is located in the center of the cable, member 40 providing strain relief protection for optics 14. The material of this member can be that of rods 26 but is jacketed with a flexible PVC material 42, for example, to provide a surface area suitable for stranding the optic bundles thereover. The diameter of rod 40 is limited in size because if it is too large, it will not be sufficiently flexible for the purposes of the invention. Therefore, rod 40 is overcoated to provide a diameter that will accommodate more optical units 12.

The individual bundles or subunits 12 in FIG. 2 are made of the same general materials as those in FIG. 1 such that the cable structure of FIG. 2 is electrically non-conductive and provides all of the insulating advantages of the cable of FIG. 1. The diameter of the cable of FIG. 2 is on the order of 15.0 mm. An appropriate diameter for center member 40 and 42 is on the order of 8.5 mm.

The cable structures shown in FIGS. 1 and 2 of the drawings can be manufactured with typical well known cabling equipment, as the structures are round. Specialized and dedicated equipment is not needed. The means for applying the components of the subunits 12 to center rod 26 are well known and used extensively in the industry. The same is true for winding the subunits on center member 40 in FIG. 2. Hence, capital outlays for making the cables of the invention are not a concern.

The all dielectric materials of the cable construction of the invention makes the cable light in weight such that the embodiment of FIG. 1 does not require a central strength member. Rather, the subunits 12 are helically wound together with the aramid yarns 20, the yarns and anti-buckling rods 26 providing more than sufficient strain relief for optics 14.

While the invention has been described in terms of preferred embodiments, the claims appended hereto are intended to encompass all embodiments which fall within the spirit of the invention.

What is claimed is:

1. A round, dry, compact, electrically non-conductive, optical fiber cable comprising:
   an outer protective jacket of electrically non-conductive material;
   a plurality of individual bundles of optical fibers located within said jacket, with each of said bundles including an anti-buckling rod made of electrically non-conductive material encapsulated by a low modulus material and a plurality of optical fibers encapsulated by a low modulus material wound on and around the low modulus material encapsulating said rod in a manner that retards contraction and microbending of the optical fibers and centers the anti-buckling rod in the plurality of optical fibers;
   with each of said bundles including one or more protective jackets of electrically non-conductive material enclosing the plurality of optical fibers, anti-buckling rod, and encapsulating material; and
   multiple strands of high modulus, water absorbing, electrically non-conductive material located inside the outer protective jacket and adjacent the jackets enclosing the bundles of optical fibers wherein the bundles of optical fibers and the multiple strands of high modulus material are tightly stranded together in a helical fashion to provide compactness inside the outer protective jacket and throughout the cable to block water and moisture from traveling through the cable.

2. The cable of claim 1 including a center strength member made of a high modulus electrically non-conductive material, with the bundles of optical fibers being wound on said center member.

3. The cable of claim 2 in which the high modulus material of the center strength member is jacketed with an electrically non-conductive material.

4. The cable of claim 1 in which the material of the high modulus multiple strands is aramid yarn.

5. The cable of claim 1 in which a ripcord for opening the outer jacket lies under the jacket.

6. The cable of claim 1 in which a ripcord lies under each of the jackets of the bundles of optical fibers.

7. The cable of claim 1 in which the outer protective jacket includes an inner wrapping of high strength, electrically non-conductive tape.

8. The cable of claim 1 in which the material of the outer protective jacket includes a flame-retardant compound.

* * * * *